United States Patent

Urushibara et al.

(10) Patent No.: US 7,613,892 B2
(45) Date of Patent: Nov. 3, 2009

(54) RECORDING DEVICE, RECORDING METHOD, RECORDING MEDIUM, AND PROGRAM

(75) Inventors: Toshichika Urushibara, Kanagawa (JP); Yoshihiro Uchiumi, Kanagawa (JP); Teruhiko Mochizuki, Tokyo (JP)

(73) Assignee: Sony Corporation, Tokyo (JP)

( * ) Notice: Subject to any disclaimer, the term of this patent is extended or adjusted under 35 U.S.C. 154(b) by 889 days.

(21) Appl. No.: 10/521,056

(22) PCT Filed: Jul. 2, 2003

(86) PCT No.: PCT/JP03/08394

§ 371 (c)(1),
(2), (4) Date: Feb. 10, 2005

(87) PCT Pub. No.: WO2004/017206

PCT Pub. Date: Feb. 26, 2004

(65) Prior Publication Data

US 2006/0126469 A1 Jun. 15, 2006

(30) Foreign Application Priority Data

Aug. 13, 2002 (JP) ............................ 2002-235765

(51) Int. Cl.
*G06F 12/00* (2006.01)

(52) U.S. Cl. ...................... 711/170; 711/105; 711/112

(58) Field of Classification Search .................. None
See application file for complete search history.

(56) References Cited

U.S. PATENT DOCUMENTS 5,956,745 A * 9/1999 Bradford et al. ............ 711/137

FOREIGN PATENT DOCUMENTS

| JP | 1-142954 | 6/1989 |
| JP | 3 246616 | 11/1991 |
| JP | 10-177509 | 6/1998 |

* cited by examiner

*Primary Examiner*—Joseph H Feild
*Assistant Examiner*—Joseph Haley
(74) *Attorney, Agent, or Firm*—Frommer Lawrence & Haug LLP; William S. Frommer; Thomas F. Presson

(57) ABSTRACT

A recording apparatus, method, recording medium, and program for recording data files, according to a FAT system, on an information-recording medium, regardless of the capacity of the information-recording medium. A FAT block of a size corresponding to the capacity of a FAT-block SDRAM is sequentially copied from the top of a FAT recorded in the information-recording medium to the FAT-block SDRAM. A block number is recorded in control data created in response to the FAT block in the FAT-block SDRAM. The number of free clusters is counted. If free clusters are available, the number and total capacity of the free clusters are recorded, the cluster address of the first free cluster is recorded, and a loadable/unloadable flag set to loadable is recorded. The present invention is applicable to video cameras.

7 Claims, 11 Drawing Sheets

RELATED ART

FIG. 2

| | |
|---|---|
| FILE A | FILE A-1 |
| | FILE A-2 |
| | FILE A-3 |
| | FILE A-4 |
| | FILE A-5 |
| | FILE A-6 |
| | FILE A-7 |
| | FILE A-8 |
| | FILE A-9 |
| | FILE A-10 |
| | FILE A-11 |
| | FILE A-12 |
| | FILE A-13 |
| | FILE A-14 |
| | FILE A-15 |
| | FILE A-16 |
| | FILE A-17 |
| | FILE A-18 |

| RECORDING AREA | |
|---|---|
| CL0 | |
| CL1 | FILE A-1 |
| CL2 | FILE A-2 |
| CL3 | FILE A-3 |
| CL4 | |
| CL5 | FILE A-4 |
| CL6 | FILE A-5 |
| CL7 | |
| CL8 | |
| CL9 | |
| CL110 | FILE A-6 |
| CL111 | |
| CL112 | FILE A-7 |
| CL113 | FILE A-8 |
| CL114 | FILE A-9 |
| CL115 | FILE A-10 |
| CL116 | FILE A-11 |
| CL117 | |
| CL118 | |
| CL119 | FILE A-12 |
| CL320 | FILE A-13 |
| CL321 | |
| CL322 | |
| CL323 | FILE A-14 |
| CL324 | FILE A-15 |
| CL325 | |
| CL326 | |
| CL327 | |
| CL328 | FILE A-16 |
| CL329 | FILE A-17 |
| CL330 | FILE A-18 |
| CL331 | |

RELATED ART

FIG. 3

| FAT | |
|---|---|
| 0 | |
| 1 | CL2 |
| 2 | CL3 |
| 3 | CL5 |
| 4 | |
| 5 | CL6 |
| 6 | CL110 |
| 7 | |
| 8 | |
| 9 | |
| 110 | CL112 |
| 111 | |
| 112 | CL113 |
| 113 | CL114 |
| 114 | CL115 |
| 115 | CL116 |
| 116 | CL119 |
| 117 | |
| 118 | |
| 119 | CL320 |
| 320 | CL323 |
| 321 | |
| 322 | |
| 323 | CL324 |
| 324 | CL328 |
| 325 | |
| 326 | |
| 327 | |
| 328 | CL329 |
| 329 | CL330 |
| 330 | EOF |
| 331 | |

⋮

RELATED ART

FIG. 4

| FILE B | |
|---|---|
| | FILE B-1 |
| | FILE B-2 |
| | FILE B-3 |
| | FILE B-4 |

| RECORDING AREA | |
|---|---|
| CL0 | FILE B-1 |
| CL1 | FILE A-1 |
| CL2 | FILE A-2 |
| CL3 | FILE A-3 |
| CL4 | FILE B-2 |
| CL5 | FILE A-4 |
| CL6 | FILE A-5 |
| CL7 | FILE B-3 |
| CL8 | FILE B-4 |
| CL9 | |
| CL110 | FILE A-6 |
| CL111 | |
| CL112 | FILE A-7 |
| CL113 | FILE A-8 |
| CL114 | FILE A-9 |
| CL115 | FILE A-10 |
| CL116 | FILE A-11 |
| CL117 | |
| CL118 | |
| CL119 | FILE A-12 |
| CL320 | FILE A-13 |
| CL321 | |
| CL322 | |
| CL323 | FILE A-14 |
| CL324 | FILE A-15 |
| CL325 | |
| CL326 | |
| CL327 | |
| CL328 | FILE A-16 |
| CL329 | FILE A-17 |
| CL330 | FILE A-18 |
| CL331 | |

RELATED ART

FIG. 5

| FAT | |
|---|---|
| 0 | CL4 |
| 1 | CL2 |
| 2 | CL3 |
| 3 | CL5 |
| 4 | CL7 |
| 5 | CL6 |
| 6 | CL110 |
| 7 | CL8 |
| 8 | EOF |
| 9 | |
| 110 | CL112 |
| 111 | |
| 112 | CL113 |
| 113 | CL114 |
| 114 | CL115 |
| 115 | CL116 |
| 116 | CL119 |
| 117 | |
| 118 | |
| 119 | CL320 |
| 320 | CL323 |
| 321 | |
| 322 | |
| 323 | CL324 |
| 324 | CL328 |
| 325 | |
| 326 | |
| 327 | |
| 328 | CL329 |
| 329 | CL330 |
| 330 | EOF |
| 331 | |

← FILE B

RELATED ART

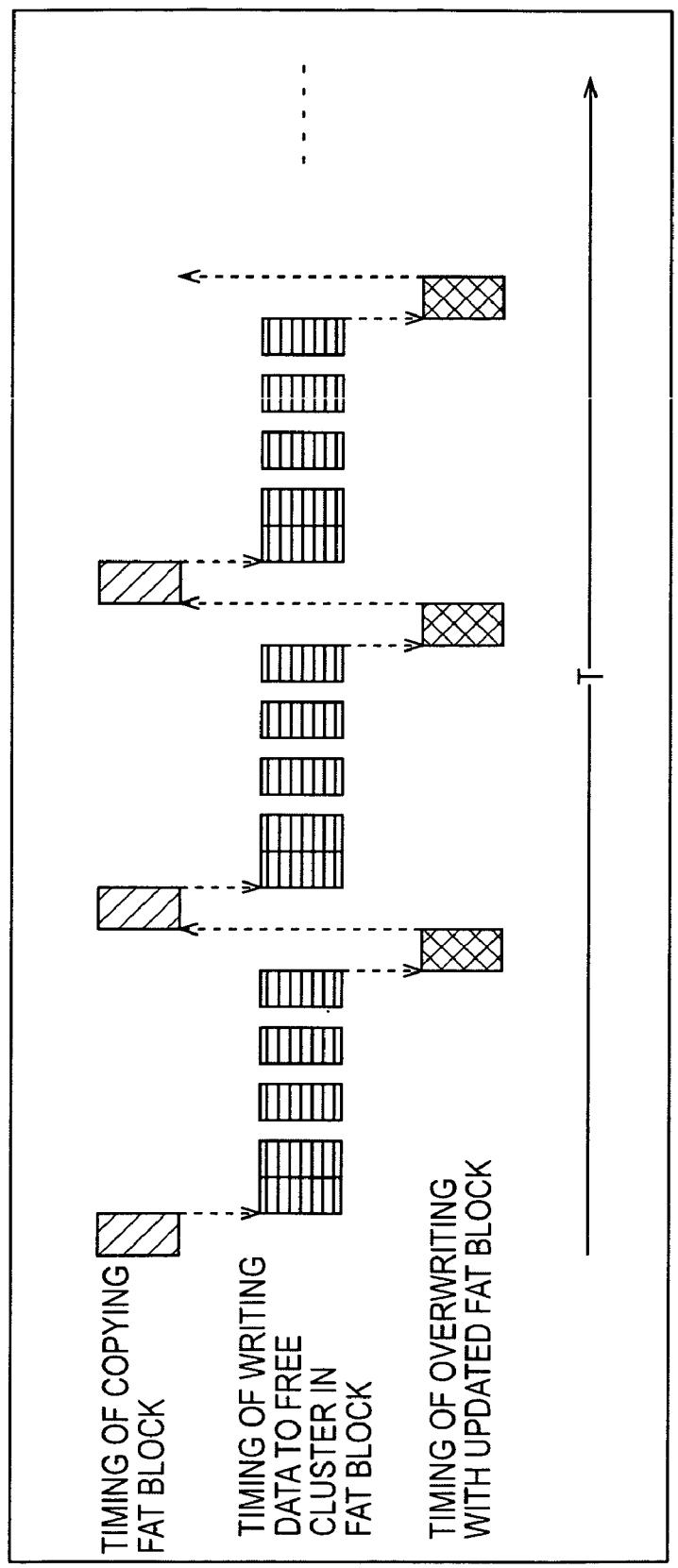

RECORDING DEVICE, RECORDING METHOD, RECORDING MEDIUM, AND PROGRAM

TECHNICAL FIELD

The present invention relates to recording apparatuses and methods, to recording media, and to programs. Specifically, the present invention relates to a recording apparatus and method, to a recording medium, and to a program that are suited for use in recording data files on an information-recording medium according to a file allocation table (FAT) system.

BACKGROUND ART

The FAT system is known as a format for writing and reading data files to and from information-recording media, such as hard disks. The FAT system, which is normally supported by personal computers loaded with operating systems (OS) such as MS-DOS and WINDOWS (registered trademark), can be described as the most widely-used file format system.

The FAT system will now be described. As shown in FIG. 1, a recording area of a FAT-formatted information-recording medium is divided into physical recording units, each called a sector. Each sector has a predetermined capacity (for example, 512 bytes) and is assigned a sector address. The information-recording medium is accessed on a sector-by-sector basis.

The recording area of the FAT-formatted information-recording medium is divided into logical recording units, each called a cluster, which contains a predetermined number of sectors (for example, 64 sectors). Each cluster is assigned a cluster address. Writing and reading files to and from the information-recording medium is controlled on a cluster-by-cluster basis.

That is, if the size of a file to be recorded is larger than the capacity of a single cluster, the file is divided into a plurality of clusters and recorded. If the size of a file to be recorded is smaller than or equal to the capacity of a single cluster, only that file is recorded in a single cluster.

A file allocation table (hereinafter described as a FAT) and a directory entry that are referred to and updated when writing and reading files are recorded in a predetermined recording area of the information-recording medium.

The FAT provides spaces corresponding to every cluster in the information-recording medium. Therefore, the size of the FAT increases with an increase in the capacity of the information-recording medium. Each space in the FAT is assigned a FAT address.

Information indicating whether a cluster at cluster address CL0 is unused or used is recorded in a space at FAT address 0. If data subsequent to data recorded in the cluster at cluster address CL0 exists, the cluster address of the cluster where the subsequent data is recorded is recorded to indicate that the cluster at cluster address CL0 is used. If no data subsequent to the data recorded in the cluster at cluster address CL0 exists (that is, the file ends with the data recorded in the cluster at cluster address CL0), an end of file (EOF) is recorded.

Similarly, information indicating whether clusters at cluster addresses CL1, 2, 3, . . . are unused or used is recorded in spaces at FAT addresses 1, 2, 3, . . . , respectively.

In the directory entry, the following are recorded for each file: the file name, extension, attributes, recording schedule information, the time of file creation, the date of file creation, the date of last access, the date and time of last update, the cluster address of a cluster where data of the top portion of the file is recorded (hereinafter described as a start cluster address), and the file size.

The cluster address of a cluster where the FAT is recorded and the cluster address of a cluster where the directory entry is recorded are included in management information recorded in the top sector of the information-recording medium. The management information also includes the capacity of the information-recording medium, and information about the number of sectors contained in one cluster.

The directory entry and the FAT will now be specifically described. For example, as shown in FIG. 2, a file A is divided into files A-1 to A-18 and is recorded in respective clusters at cluster addresses CL1, CL2, CL3, CL5, CL6, CL110, CL112, CL113, CL114, CL115, CL116, CL119, CL320, CL323, CL324, CL328, CL329, and CL330 in the information-recording medium.

In this case, cluster address CL1 is recorded, in the directory entry, as the start cluster address of the file A.

In the FAT, as shown in FIG. 3, cluster address CL2 is recorded in a space at FAT address 1, cluster address CL3 is recorded in a space at FAT address 2, and cluster address CL5 is recorded in a space at FAT address 3. The rest are omitted. The EOF is recorded in a space at FAT address 330 at the end. In FIG. 3, information indicating that corresponding clusters are unused is recorded in blank spaces, for example, at FAT address 0, FAT address 4, and FAT address 7. In other words, according to the FAT shown in FIG. 3, clusters, such as at cluster addresses CL0, CL4, and CL7 are free clusters.

The FAT and the directory entry that are updated every time a file is recorded on the information-recording medium, as described above, are used for reading files.

For example, the process of reading the file A from the information-recording medium will be described. First, the directory entry and the FAT, which are recorded on the information-recording medium, are copied to an embedded memory (such as a dynamic random access memory (DRAM)) of a playback apparatus. Then the directory entry in the embedded memory is referred to, the start cluster of the file A (in this case, the cluster address CL1) is read, and the file A-1 is read from the cluster at cluster address CL1.

Subsequently, the FAT in the embedded memory is referred to, the next cluster address CL2 is read from the space at FAT address 1 corresponding to cluster address CL1, and the file A-2 is read from the cluster at cluster address CL2. Then, the FAT in the embedded memory is referred to, the next cluster address CL3 is read from the space at FAT address 2 corresponding to cluster address CL2, and the file A-3 is read from the cluster at cluster address CL3.

Similarly, the files A-4 to A-18 are sequentially read, and the EOF is finally read from FAT address 330 corresponding to cluster address CL330, thereby being recognized that the files have been read until the end. Thus the reading is completed.

The process of recording a file B of a size of about 4 clusters onto the information-recording medium in the state shown in FIG. 2 will be described. First, the directory entry recorded in the information-recording medium and the FAT in the state shown in FIG. 3 are copied to the embedded memory in the recording apparatus.

Then the FAT in the embedded memory is referred to, cluster address CL0 is detected as a free cluster, one cluster of data, which is the first file B-1 from the top of the file B, is recorded in the free cluster at cluster address CL0, and cluster address CL4 is detected as the next free cluster. Cluster address CL4 is then written to the space at FAT address 0 of the FAT corresponding to cluster address CL0.

Next, one cluster of data, which is the second file B-2 from the top of the file B, is recorded in the free cluster at cluster address CL4, and cluster address CL7 is detected as the next free cluster. Cluster address CL7 is then written to the space at FAT address 4 of the FAT corresponding to cluster address CL4.

Next, one cluster of data, which is the third file B-3 from the top of the file B, is recorded in the free cluster at cluster address CL7, and cluster address CL8 is detected as the next free cluster. Cluster address CL8 is then written to the space at FAT address 7 of the FAT corresponding to cluster address CL7.

Next, one cluster of data, which is the fourth file B-4 from the top of the file B, is recorded in the free cluster at cluster address CL8. Since the file B has thus been recorded until the end, the EOF is written in the space at FAT address 8 of the FAT corresponding to cluster address CL8.

Subsequently, the directory entry in the embedded memory is updated (the file name of the file B, the start cluster address CL0, and the like are recorded), and the directory entry and FAT in the embedded memory are written over the directory entry and FAT on the information-recording medium, thereby completing the recording of the file B. Through the process described above, the file B divided into the files B-1 to B-4 is recorded on the information-recording medium as shown in FIG. 4. The FAT recorded on the information-recording medium is updated to the state shown in FIG. 5.

As described above, for reading and writing files according to the FAT system, the FAT is copied from the information-recording medium to the embedded memory and the FAT in the embedded memory is referred to. This is because if, for example, a cluster address is first detected by reference to the FAT on the information-recording medium, and then data is written to and read from a cluster at the detected cluster address, the movement of a head and pickup of the information-recording medium takes time and may cause a delay in reading and writing of data. If the data to be read and written is audio and video (AV) data, played-back images and sounds are interrupted or lost.

To copy the FAT from the information-recording medium to the embedded memory, the capacity of the embedded memory needs to be at least larger than the size of the FAT.

The FAT size, which is proportional to the capacity of the information-recording medium, will be discussed here. If, for example, the capacity of the information-recording medium is 8 gigabytes, one sector is 512 bytes, and one cluster contains 64 sectors, about 250,000 clusters are present in the information-recording medium. Therefore, if one FAT space is bytes, the total size of the FAT is about 1 megabyte.

Therefore, the embedded memory of the recording apparatus or playback apparatus accommodating the information-recording medium of 8 gigabytes needs to have a capacity of at least 1 megabyte.

These days, information-recording media, such as hard disks, have significantly grown in capacity and decreased in size. Moreover, there are information-recording media, such as microdrives, that are small in size, large in capacity, and removable.

For adapting such removable information-recording media to apparatuses for reading and writing files according to the FAT system, the capacity of the embedded memory to which the FAT is copied cannot be uniquely determined, since removable information-recording media are currently available in varying capacities and a further increase in their capacity is expected.

It is possible to set the capacity of an embedded memory based on the expected upper limit of the capacity of a removable information-recording medium. However, this leads to cost inefficiency since an unnecessarily large memory is to be embedded. Moreover, if a removable information-recording medium with a capacity over the expected upper limit becomes available, it cannot be used.

DISCLOSURE OF INVENTION

The present invention is made in view of the circumstances described above and is intended to record files, in the FAT system, on information-recording media of any capacity without unnecessarily increasing the size of an embedded memory.

A recording apparatus of the present invention includes creating means for dividing a FAT in an information-recording medium into a plurality of segment tables of a predetermined size and creating control information corresponding to each of the segment tables; reading means for reading a segment table from the information-recording medium according to the control information created by the creating means; maintaining means for maintaining the segment table read by the reading means; recording means for referring to the segment table maintained by the maintaining means to detect free unit recording areas in the information-recording medium, and recording data files in the detected unit recording areas; updating means for updating the segment table maintained by the maintaining means, in response to the process of the recording means; and overwriting means for partially overwriting the FAT in the information-recording medium with the updated segment table.

The control information may include at least one of information for identifying the corresponding segment table, the number of the free unit recording areas indicated by the segment table, the total capacity of the free unit areas, the address of the first free unit recording area indicated by the segment table, and a flag for specifying whether or not the corresponding segment table is to be read at the time of recording the data files.

The information-recording medium may be removable.

The information-recording medium may be a microdrive.

The size of the segment table may be determined according to the capacity of the maintaining means.

The overwriting means may write the entire updated segment table, including non-updated sections, over the corresponding part of the FAT recorded in the information-recording medium.

A recording method of the present invention includes a creating step of dividing a FAT in an information-recording medium into a plurality of segment tables of a predetermined size and creating control information corresponding to each of the segment tables; a reading step of reading a segment table from the information-recording medium according to the control information created in the creating step; a maintaining step of maintaining the segment table read in the reading step; a recording step of referring to the segment table maintained in the maintaining step to detect free unit recording areas in the information-recording medium, and recording data files in the detected unit recording areas; an updating step of updating the segment table maintained in the maintaining step, in response to the recording step; and an overwriting step of partially overwriting the FAT in the information-recording medium with the updated segment table.

A program in a recording medium of the present invention includes a creating step of dividing a FAT in an information-recording medium into a plurality of segment tables of a predetermined size and creating control information corresponding to each of the segment tables; a reading step of reading a segment table from the information-recording medium according to the control information created in the creating step; a maintaining step of maintaining the segment table read in the reading step; a recording step of referring to the segment table maintained in the maintaining step to detect free unit recording areas in the information-recording medium, and recording data files in the detected unit recording areas; an updating step of updating the segment table maintained in the maintaining step, in response to the recording step; and an overwriting step of partially overwriting the FAT in the information-recording medium with the updated segment table.

A program of the present invention allows a computer to execute the process including a creating step of dividing a FAT in an information-recording medium into a plurality of segment tables of a predetermined size and creating control information corresponding to each of the segment tables; a reading step of reading a segment table from the information-recording medium according to the control information created in the creating step; a maintaining step of maintaining the segment table read in the reading step; a recording step of referring to the segment table maintained in the maintaining step to detect free unit recording areas in the information-recording medium, and recording data files in the detected unit recording areas; an updating step of updating the segment table maintained in the maintaining step, in response to the recording step; and an overwriting step of partially overwriting the FAT in the information-recording medium with the updated segment table.

In the recording apparatus and method, and program of the present invention, a FAT in an information-recording medium is divided into a plurality of segment tables of a predetermined size and control information corresponding to each of the segment tables is created; a segment table is read from the information-recording medium according to the created control information and is maintained; the maintained segment table is referred to so as to detect free unit recording areas in the information-recording medium; and data files are recorded in the detected unit recording areas. In response to this recording process, the maintained segment table is updated, and the FAT in the information-recording medium is partially overwritten with the updated segment table.

The recording apparatus may be either an independent apparatus or a block for executing a recording function of a recording/playback apparatus.

BRIEF DESCRIPTION OF THE DRAWINGS

FIG. 2 is a diagram showing the state of a file divided into a plurality of clusters and recorded.

FIG. 3 is a diagram showing an example of a FAT corresponding to the state shown in FIG. 2.

FIG. 4 is a diagram showing the state where additional files are recorded in the state shown in FIG. 2.

FIG. 5 is a diagram showing an example of a FAT corresponding to the state shown in FIG. 4.

FIG. 12 is a diagram for explaining the timing of image recording shown in FIG. 9.

BEST MODE FOR CARRYING OUT THE INVENTION

An image-recording apparatus according to an embodiment of the present invention will now be described with reference to the drawings.

To copy a FAT recorded on an information-recording medium to an embedded memory, the image-recording apparatus copies the FAT divided into given-sized FAT blocks, instead of copying the entire FAT, such that files can be recorded, in the FAT system, on information-recording media of any capacity without unnecessarily increasing the size of the embedded memory.

Figure 1:
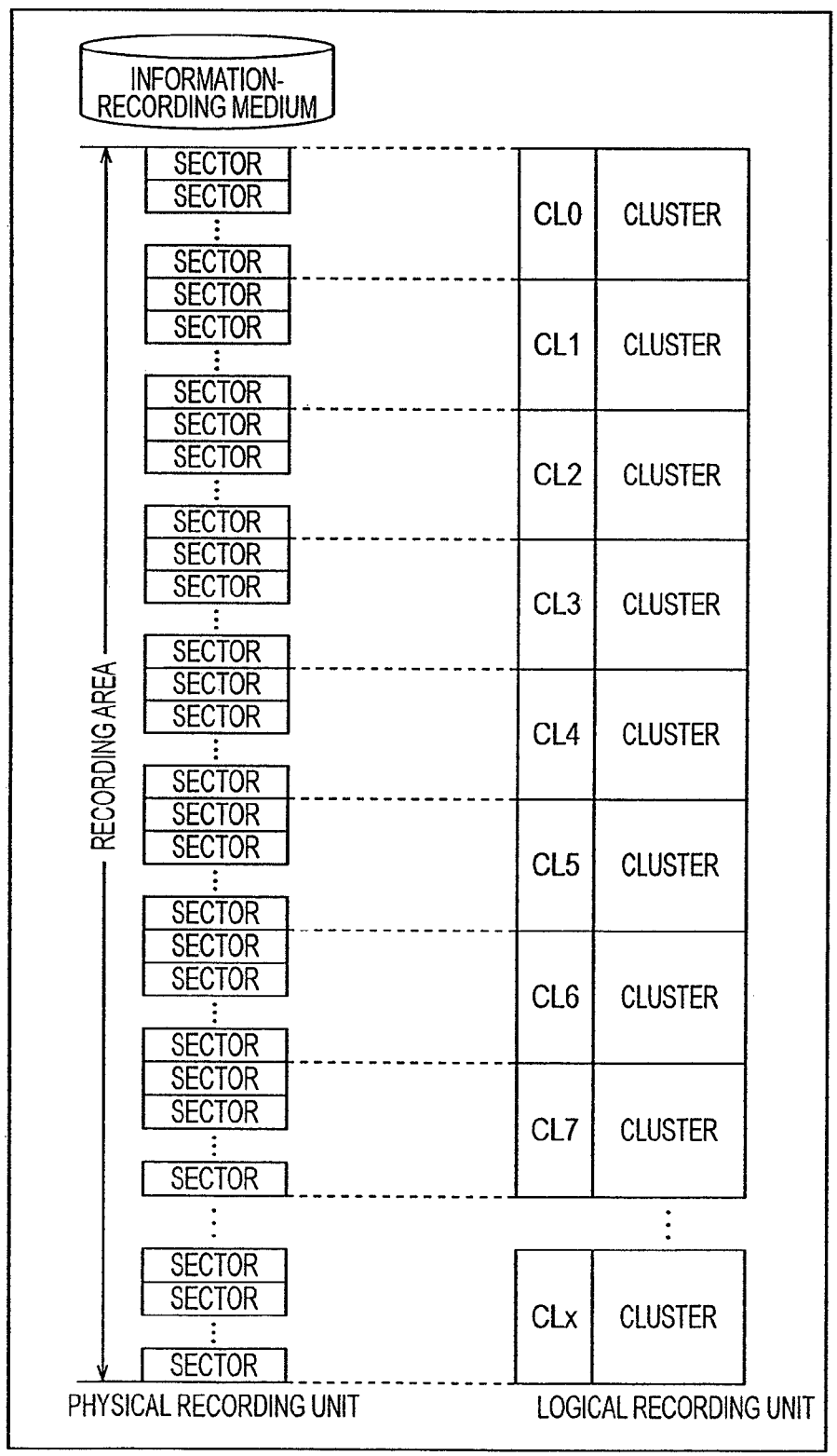
FIG. 1 is a diagram showing sectors, which are physical recording units of an information-recording medium, and clusters, which are logical recording units of the information-recording medium.
Figure 6:
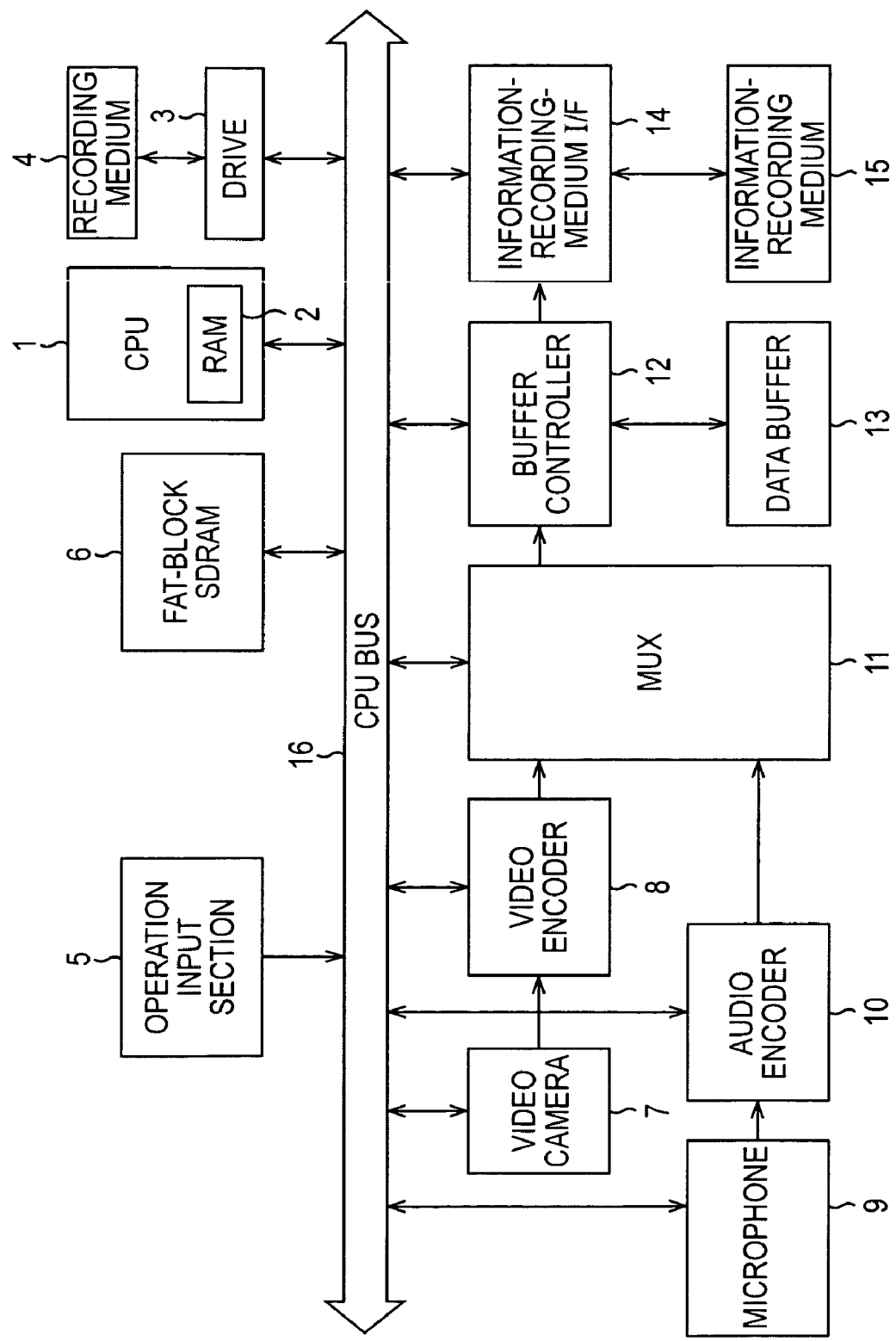
FIG. 6 is a block diagram showing an example of the structure of an image-recording apparatus according to an embodiment of the present invention.

FIG. 6 shows an example of the structure of the image-recording apparatus. A CPU 1 controls a drive 3 via a CPU bus 16; reads a control program stored on a recording medium 4, such as a magnetic disc, an optical disc, a magneto-optical disc, and a semiconductor memory; and controls the start and end of the operation at each section of the image-recording apparatus in response to the control program read and user operation information entered from an operation input section 5 via the CPU bus 16. In particular, the CPU 1 controls an information-recording-medium interface (I/F) 14 via the CPU bus 16 to control the writing and reading of data to and from an information-recording medium 15. Moreover, the CPU 1 creates control data corresponding to FAT blocks sequentially copied to a FAT-block SDRAM 6.

The control data created by the CPU 1 is stored in a RAM 2 embedded in the CPU 1. The RAM 2 may be provided outside the CPU 1.

The operation input section 5 is a user interface, such as operation buttons. The operation input section 5 receives an operation (such as an instruction operation to start image-recording and finish image-recording) entered by a user and outputs it as operation information to the CPU 1 via the CPU bus 16.

Figure 7:
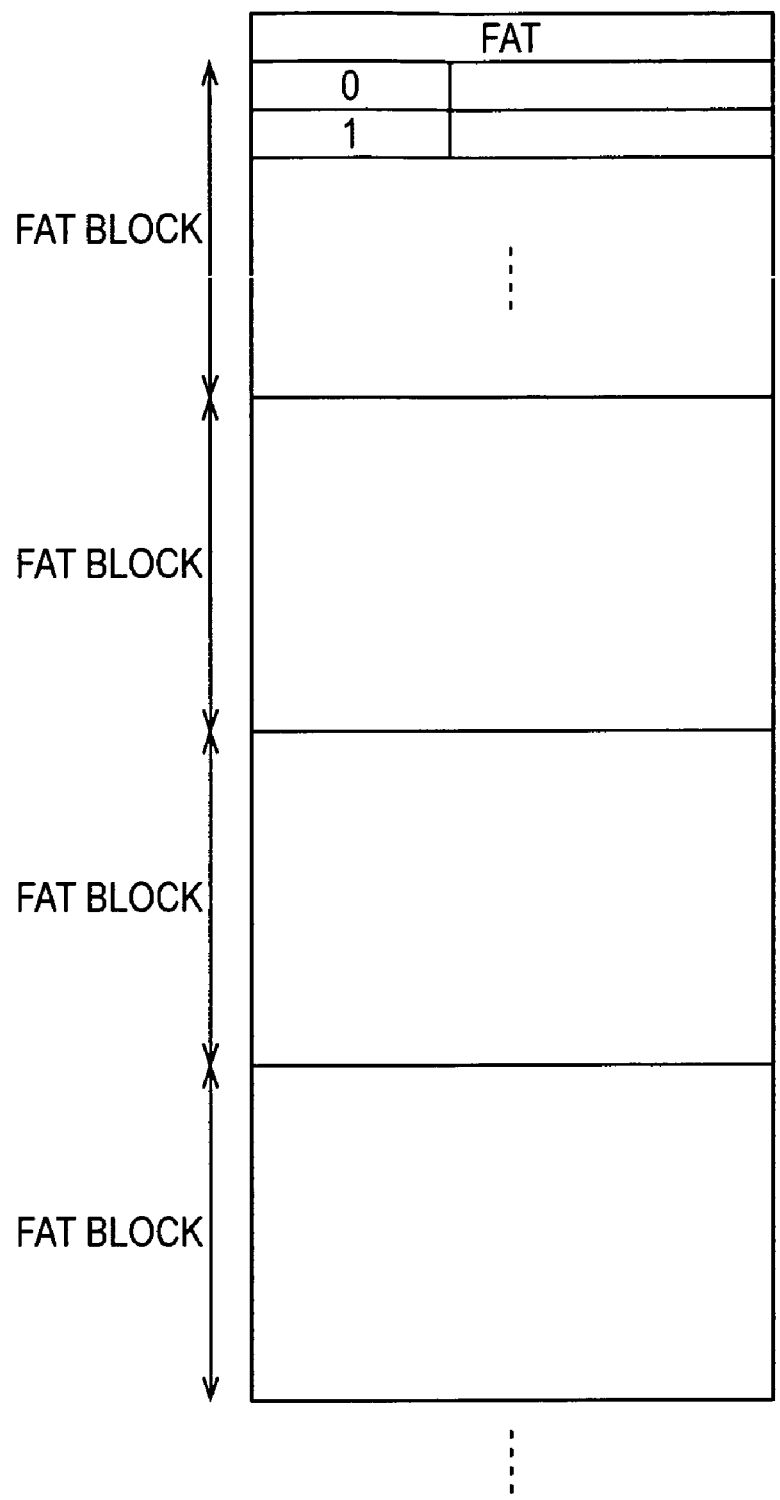
FIG. 7 is a diagram for explaining a FAT block.

Under the control of the CPU 1, a FAT block corresponding to the capacity of the FAT-block SDRAM 6 is copied to the volatile FAT-block SDRAM 6 from a FAT recorded on the information-recording medium 15, as shown in FIG. 7. The FAT block copied to the FAT-block SDRAM 6 is referred to by the CPU 1 to detect a free cluster, updated, and then written over the information-recording medium 15.

The capacity of the FAT-block SDRAM 6 needs not to be particularly large. Examples include, but are not limited to, 32 kilobytes or 256 kilobytes.

A video camera 7 captures a subject and sequentially outputs the obtained video signals to a video encoder 8. The video encoder 8 encodes the video signals sequentially inputted from the video camera 7 in a predetermined system (such as the Moving Picture Experts Group (MPEG) 2 standard) and outputs the obtained encoded video data to a mixer (MUX) 11. A microphone 9 sequentially outputs collected audio signals to an audio encoder 10. The audio encoder 10 encodes the audio signals sequentially inputted from the microphone 9 in a predetermined system and outputs the obtained encoded audio data to the mixer 11. The mixer 11 multiplexes the encoded video data inputted from the video encoder 8 and the encoded audio data inputted from the audio encoder 10 to create a program stream and outputs it to a buffer controller 12.

The buffer controller 12 buffers program stream data inputted from the mixer 11 to a data buffer 13, sends a write request to the CPU 1 every time one cluster of program stream data is accumulated in the data buffer 13, and outputs the accumulated data to the information-recording-medium I/F 14. The program stream data accumulated in the data buffer 13 is maintained until being successfully written to the information-recording medium 15.

Based on the control by the CPU 1, the information-recording-medium I/F 14 reads out data (such as directory entries and FAT blocks) recorded on the information-recording medium 15. Based on the control by the CPU 1, moreover, the information-recording-medium I/F 14 records the program stream data inputted from the buffer controller 12 at the cluster address specified by the CPU 1. Based on the control by the CPU 1, furthermore, the information-recording-medium I/F 14 overwrites the information-recording medium 15 with the FAT block updated in the FAT-block SDRAM 6.

The information-recording medium 15 is, for example, a microdrive, which is removable with respect to the information-recording-medium I/F 14. If the capacity of the information-recording medium 15 is 8 gigabytes and the program stream is outputted from the mixer 11 at 9 megabits per second (bps), about 2 hours of AV signals can be recorded. In this case, the capacity of the data buffer 13 is as much as 8 megabytes in view of the occurrence of data write errors or the like.

If one sector of the information-recording medium 15 of 8 gigabytes is 512 bytes and one cluster contains 64 sectors, about $25 \times 10^4$ clusters are present. Therefore, if one space of the FAT is 4 bytes, the size of the FAT is about 1 megabyte.

The control data created by the CPU 1 and corresponding to each FAT block constituting the FAT will now be described. The control data is created in advance before files (program streams) are recorded on the information-recording medium 15, and is mainly used for recording the files.

For example, if the FAT recorded on the information-recording medium 15 of 8 gigabytes is 1 megabyte and the capacity of the FAT-block SDRAM 6 is 32 kilobytes, the size of a FAT block is 32 kilobytes. Therefore, the number of FAT blocks is 32 ($=1 \times 10^6 / 32 \times 10^3$). In this case, 32 pieces of control data are created and recorded in the RAM 2 embedded in the CPU 1.

Moreover, for example, if the FAT recorded on the information-recording medium 15 of 8 gigabytes is 1 megabyte and the capacity of the FAT-block SDRAM 6 is 256 kilobytes, the size of a FAT block is 256 kilobytes. Therefore, the number of FAT blocks is 4 ($=1 \times 10^6 / 256 \times 10^3$). In this case, 4 pieces of control data are created and recorded in the RAM 2 embedded in the CPU 1.

Those recorded in each control data are: a block number (for example, 18×2 bits) that is information to identify the corresponding FAT block; the number of free clusters (for example, 18 bits) in a plurality of clusters contained in the corresponding FAT block; the total capacity (for example, 33 bits) of the free clusters; a loadable/unloadable flag (for example, 1 bit) for specifying whether or not the corresponding FAT block is to be copied to the FAT-block SDRAM 6 at the time of recording; and the first cluster address (for example, 18 bits) of free clusters in the corresponding FAT block.

The start and end FAT addresses of the corresponding FAT block are used as the block number. If the number of free clusters is 1 or above, the loadable/unloadable flag is set to "loadable". Conversely, if the number of free clusters is 0, the loadable/unloadable flag is set to "unloadable".

For example, if 32 pieces of control data are created, the total size of the control data is 492 bytes=3392 ($=(18 \times 2+18+33+1+18) \times 32$) bits. If 4 pieces of control data are created, the size of the control data is 53 bytes=424 ($=(18 \times 2+18+33+1+18) \times 4$) bits.

Figure 8:
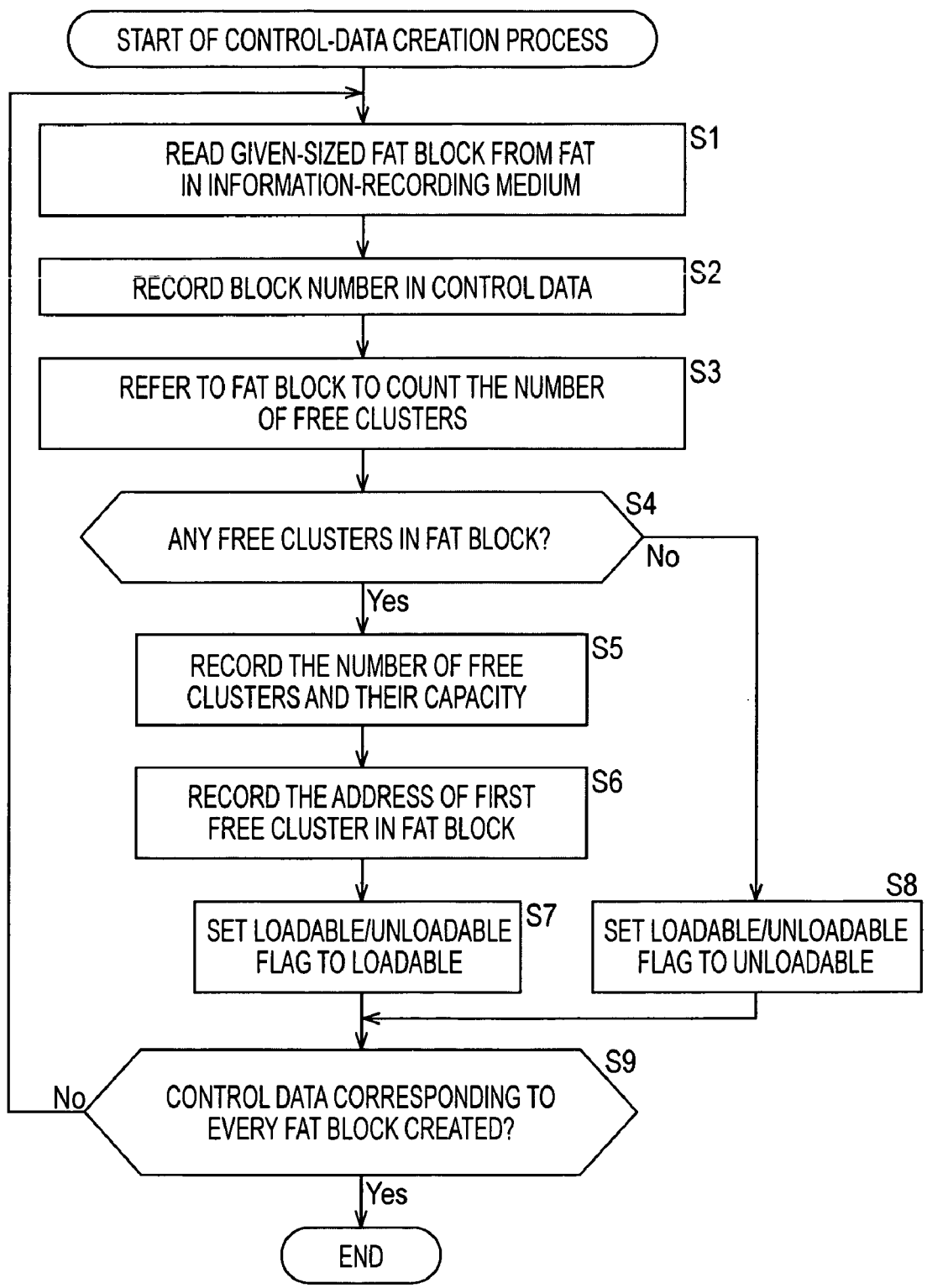
FIG. 8 is a flowchart for explaining the process of control-data creation.

The creation of control data will now be described with reference to the flowchart in FIG. 8. The creation of control data starts when the power of the image-recording apparatus is turned on.

In step S1, the CPU 1 controls the information-recording-medium I/F 14 via the CPU bus 16 such that a FAT block having a size (in this case 32 kilobytes) corresponding to the capacity of the FAT-block SDRAM 6 is sequentially copied to the FAT-block SDRAM 6 from the top of the FAT recorded in the information-recording medium 15.

In step S2, the CPU 1 records the start and end FAT addresses of the FAT block, as the block number, in control data created in the RAM 2 in response to the FAT block in the FAT-block SDRAM 6.

In step S3, the CPU 1 refers to the FAT block in the FAT-block SDRAM 6 so as to count the number of free clusters included in a plurality of corresponding clusters. In step S4, the CPU 1 determines, based on the number of free clusters, whether or not the free cluster is available in the plurality of clusters corresponding to the FAT block. If it is determined that the free cluster is available, the process proceeds to step S5.

In step S5, the CPU 1 records, in the control data in the RAM 2, the number of free clusters in the FAT block and their total capacity. In step S6, the CPU 1 records, in the control data in the RAM 2, the cluster address of the first free cluster of the FAT block. In step S7, the CPU 1 sets, in the control data in the RAM 2, a loadable/unloadable flag to loadable.

If it is determined, in step S4, that no free cluster is available in the plurality of clusters corresponding to the FAT block, the process proceeds to step S8. In step S8, the CPU 1 sets, in the control data in the RAM 2, the loadable/unloadable flag to unloadable.

Through the process described above, a single piece of control data corresponding to the FAT block in the FAT-block SDRAM 6 is created in the RAM 2.

In step S9, the CPU 1 determines whether or not control data corresponding to every FAT block has been created (that is, in this case, whether or not 32 pieces of control data have been created). If it is not determined that control data corresponding to every FAT block has been created, the process returns to step S1 to repeat the subsequent steps.

Subsequently, if it is determined, in step S9, that control data corresponding to every FAT block has been created (that is, in this case, 32 pieces of control data have been created), the creation of control data is completed and image recording described below becomes executable.

Figure 9:
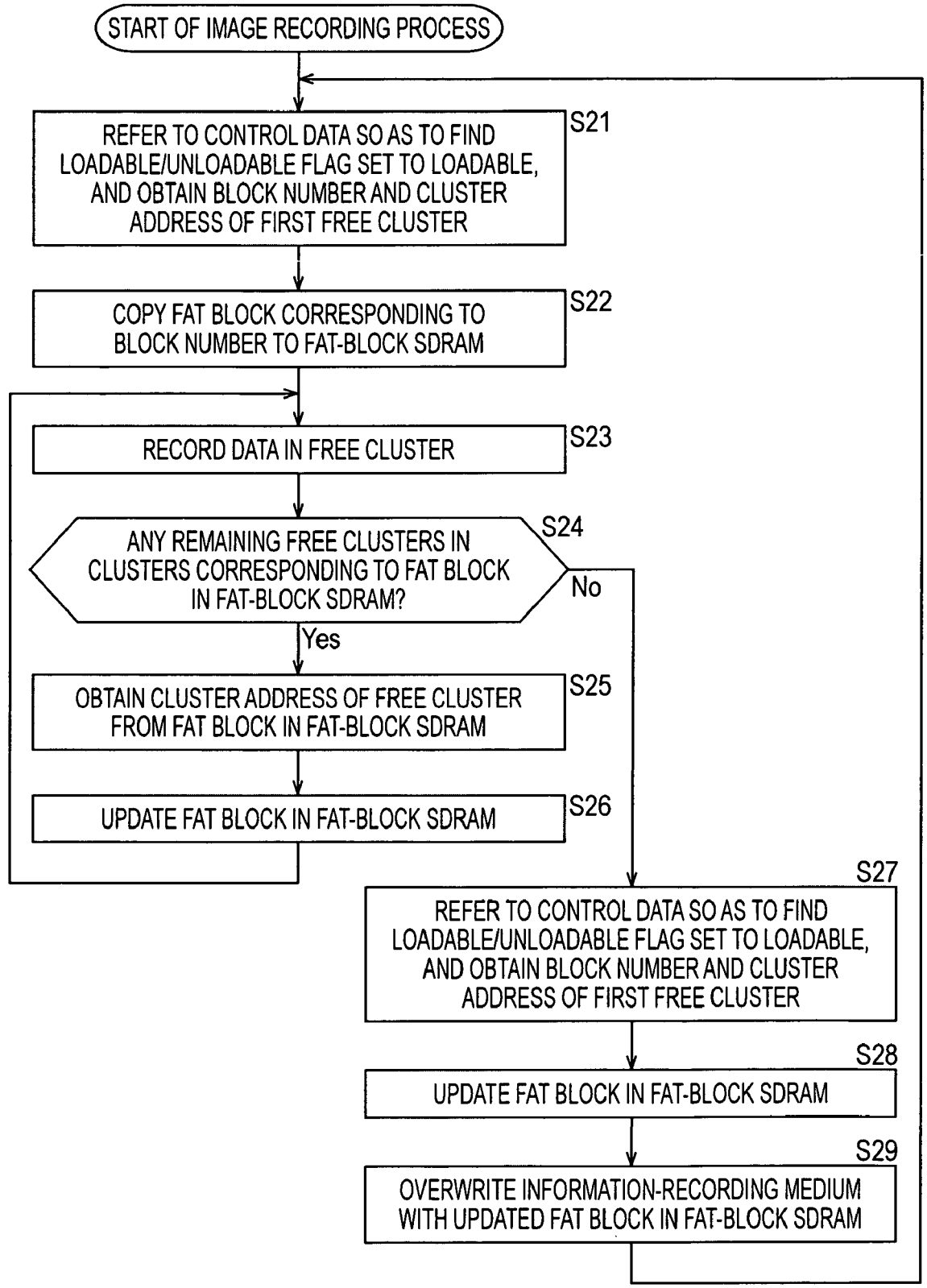
FIG. 9 is a flowchart for explaining the process of image recording.

The process of image recording will now be described with reference to the flowchart in FIG. 9. First, a user performs an operation to start image recording. In response, the CPU 1 instructs each section of the image-recording apparatus to start image recording. Thus, the process of image recording starts when each section starts its operation (for example, when the video camera 7 outputs video signals, the video encoder 8 outputs encoded video data, the mixer 11 outputs program streams, and data begins to accumulate in the data buffer 13).

In step S21, the CPU 1 searches the plurality of control data in the RAM 2 for a loadable/unloadable flag set to loadable, in order of block number, and obtains the block number and the cluster address of the first free cluster.

In step S22, the CPU 1 controls the information-recording-medium I/F 14 via the CPU bus 16 such that a FAT block corresponding to the obtained block number is read from the FAT recorded in the information-recording medium 15 and is copied to the FAT-block SDRAM 6. Here, a plurality of clusters corresponding to the FAT block copied to the FAT-block SDRAM 6 include at least one free cluster without exception.

In step S23, the CPU 1 waits until the buffer controller 12 sends a write request. When the write request is received from the buffer controller 12, the CPU 1 outputs the obtained cluster address of the free cluster and a write command to the information-recording-medium I/F 14 via the CPU bus 16 such that the information-recording-medium I/F 14 records program stream data inputted from the buffer controller 12.

In step S24, the CPU 1 refers to the FAT block in the FAT-block SDRAM 6 so as to determine whether or not there are any remaining free clusters in the plurality of clusters corresponding to this FAT block. If it is determined that there is a remaining free cluster, the process proceeds to step S25.

In step S25, the CPU 1 obtains the cluster address of the next free cluster from the FAT block in the FAT-block SDRAM 6. In step S26, the CPU 1 updates the FAT block in the FAT-block SDRAM 6 in response to the process in step S23. Specifically, the cluster address of the next free cluster obtained in the process in step S25 is recorded in the FAT block space corresponding to the free cluster where data has been recorded in the process in step S23. The process returns to step S23 to repeat the subsequent steps. This repetitive process enables data to be written to free clusters included in the plurality of clusters corresponding to the FAT block in the FAT-block SDRAM 6.

Subsequently, if it is determined, in step S24, that there is no remaining free cluster in the plurality of clusters corresponding to the FAT block in the FAT-block SDRAM 6, the process proceeds to step S27.

In step S27, the CPU 1 searches the plurality of control data in the RAM 2 for the loadable/unloadable flag set to loadable, in order of block number, and obtains the block number and the cluster address of the first free cluster.

In step S28, the CPU 1 updates the FAT block in the FAT-block SDRAM 6 in response to the process in step S23. Specifically, the cluster address of the first free cluster in the FAT block to be subsequently copied to the FAT-block SDRAM 6, the cluster address being obtained in the process in step S27, is recorded in the FAT block space corresponding to the free cluster where data has been recorded in the process in step S23.

In step S29, the CPU 1 controls the information-recording medium 14 via the CPU bus 16 such that the updated FAT block in the FAT-block SDRAM 6 is written over the FAT recorded in the information-recording medium 15.

Figure 10:
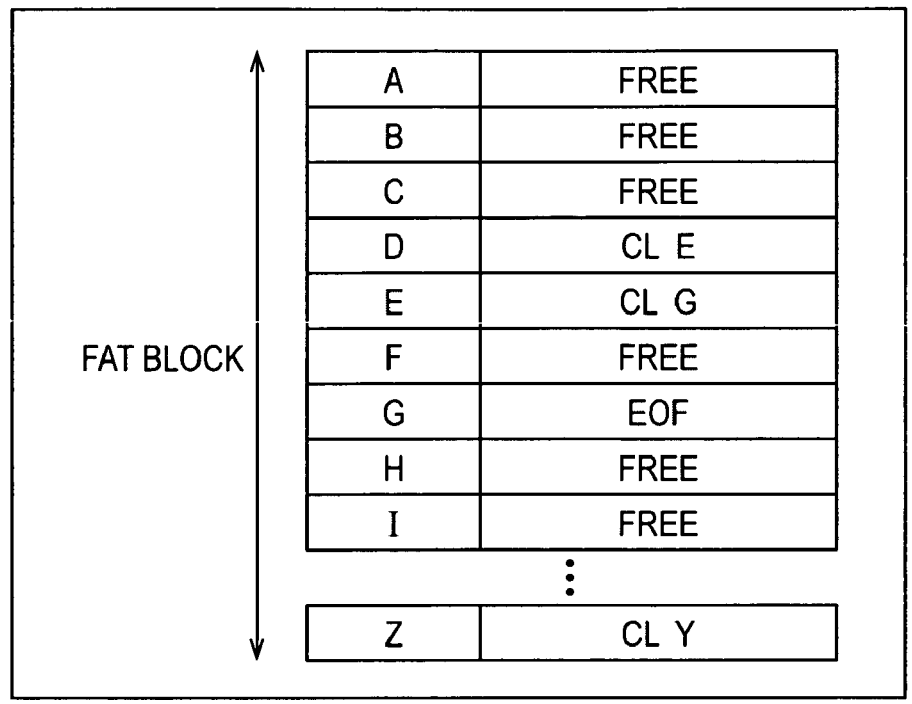
FIG. 10 is a diagram showing an example of a FAT before being updated.

The process in step S29 will be described with reference to FIG. 10 and FIG. 11. For example, FIG. 10 shows the FAT block copied to the FAT-block SDRAM 6 from the information-recording medium 15 in the process in step S22. Therefore, the FAT block shown in FIG. 10 is also recorded on the information-recording medium 15 before the process in step S29 is executed.

Figure 11:
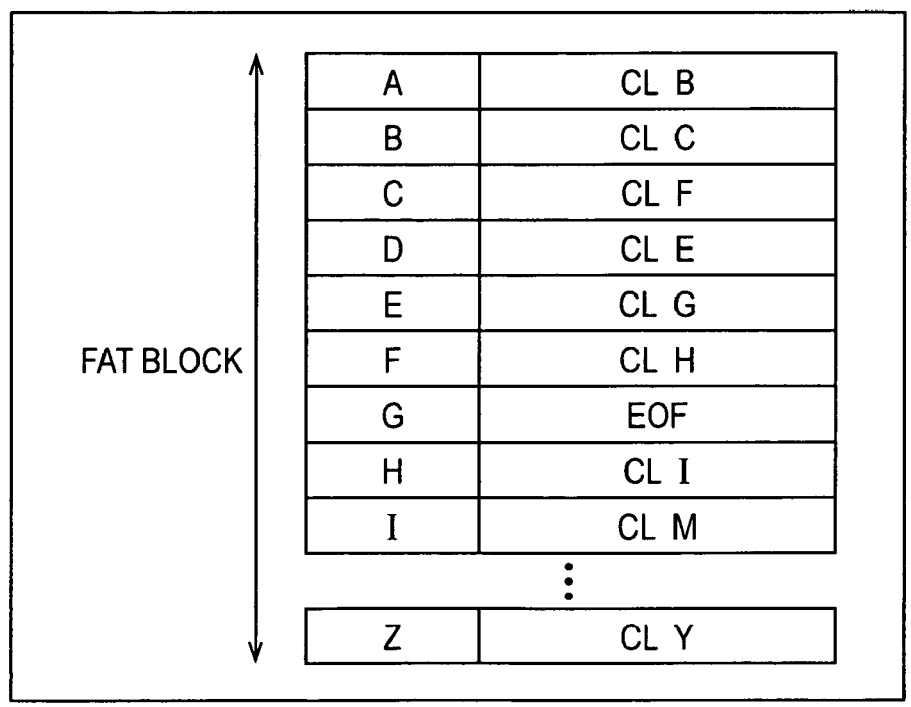
FIG. 11 is a diagram showing an example of a FAT after being updated.

FIG. 11 shows the updated FAT block in the FAT-block SDRAM 6 after the process in step S28 is executed.

That is, in the process in step S29, the FAT block shown in FIG. 10 is overwritten with the FAT block shown in FIG. 11. Those overwritten here are not only updated spaces at, for example, FAT addresses CL A, CL B, CL C, CL F, CL H, and CL I. Instead, the entire FAT block, that is, from the start FAT address CL A to the end FAT address CL Z, including the FAT addresses CL D, CL E, CL G, and CL Z, which are not updated, are overwritten.

In the process of overwriting the entire FAT block, the amount of data to be written is large compared to the process where only updated sections are overwritten. However, the time required for writing can be reduced since data can be sequentially written.

Referring back to FIG. 9, after the process in step S29 is executed, the process returns to step S22, where the next FAT block is copied to the FAT-block SDRAM 6, and then the same steps are repeated.

The process of image recording is completed when the user performs an operation to end the image recording. Specifically, program stream data until the point at which the termination of the image-recording process is requested by the user is recorded in free clusters, and the EOF is recorded in the FAT block space corresponding to a cluster where the end of data is recorded. Thereby, the FAT block in the FAT-block SDRAM 6 is updated, and the updated FAT block is written over the information-recording medium 15. Moreover, the directory entry of the information-recording medium 15 is updated. Subsequently, the above-described creation of control data is executed again.

FIG. 12 shows, in the process of image recording, the timing of copying the FAT block to the FAT-block SDRAM 6 (the process in step S22), the timing of writing data to free clusters in the plurality of clusters corresponding to the FAT block in the FAT-block SDRAM 6 (the process in step S23), and the timing of overwriting the information-recording medium 15 with the updated FAT block in the FAT-block SDRAM 6 (the process in step S29).

As shown in FIG. 12, the process of writing data to free clusters is in standby mode while the updated FAT block in the FAT-block SDRAM 6 is written over the information-recording medium 15 and while the FAT block is copied to the FAT-block SDRAM 6. Although program streams continue to be created during this standby mode, no loss in recording occurs since they are stored in the data buffer 13.

Note that although data is normally recorded on the information-recording medium 15 at regular time intervals, the time intervals for recording are reduced immediately after overwriting the information-recording medium 15 with the updated FAT block in the FAT-block SDRAM 6 and immediately after copying the FAT block to the FAT-block SDRAM 6, since the amount of data stored in the data buffer 13 increases. The explanation for the process of image recording is thus completed.

As described above, according to the image-recording apparatus to which the present invention is applied, sequential data, such as program streams, can be recorded on an information-recording medium of any capacity.

Moreover, since the information-recording medium on which data streams are recorded by the image-recording apparatus to which the present invention is applied fully complies with the standard FAT format, a general-purpose personal computer and the like can directly access the information-recording medium.

The present invention can not only be applied to the image-recording apparatus for recording AV signals, such as the present embodiment, but can also be applied to apparatuses for recording any data on FAT-formatted information-recording media.

The series of steps described above may be executed either by hardware or by software. For executing the series of steps by software, programs constituting the software are installed from a recording medium (for example, the recording medium 4 in FIG. 6) into a computer (for example, the CPU 1 in FIG. 6) implemented in dedicated hardware or into a general-purpose personal computer or the like capable of executing various functions by installing various programs.

The recording medium may be a package medium offered to provide users with programs, apart from the computer, in the form of a magnetic disc (including flexible disks), an optical disc (including compact disc-read only memories (CD-ROMs) and digital versatile discs (DVDs)), a magneto-optical disc (including mini discs (MDs)), a semiconductor memory, or the like containing the programs. The recording medium may be offered to users in the form of a ROM or hard disk containing the programs and being incorporated beforehand in the computer.

In the present description, the steps of describing programs to be recorded on the recording medium not only include processes to be chronologically executed in order of description, but also include processes to be executed concurrently or individually, not necessarily chronologically.

INDUSTRIAL APPLICABILITY

As described above, in the present invention, data files can be recorded, in the FAT system, on information-recording media of any capacity without unnecessarily increasing the capacity of the embedded memory.

Moreover, in the present invention, data files can be recorded, in the FAT system, on removable information-recording media of any capacity.

The invention claimed is:

1. A recording apparatus for recording data files on a FAT-formatted information-recording medium, comprising:
creating means for dividing a FAT in the information-recording medium into a plurality of segment tables of a predetermined size and creating control information corresponding to each of the segment tables;
reading means for reading a segment table from the information-recording medium according to the control information created by the creating means;
maintaining means for maintaining the segment table read by the reading means;
recording means for referring to the segment table maintained by the maintaining means to detect free unit recording areas in the information-recording medium, and recording the data files in the detected unit recording areas;
updating means for updating the segment table maintained by the maintaining means, in response to the process of the recording means; and
overwriting means for partially overwriting the FAT in the information-recording medium with the updated segment table,
wherein the control information includes information for identifying the corresponding segment table, the number of the free unit recording areas indicated by the segment table, the total capacity of the free unit areas, the address of the first free unit recording area indicated by the segment table, and a flag for specifying whether or not the corresponding segment table is to be read at the time of recording the data files.

2. The recording apparatus according to claim 1, wherein the information-recording medium is removable.

3. The recording apparatus according to claim 1, wherein the information-recording medium is a microdrive.

4. The recording apparatus according to claim 1, wherein the size of the segment table is determined according to the capacity of the maintaining means.

5. The recording apparatus according to claim 1, wherein the overwriting means writes the entire updated segment table, including non-updated sections, over the corresponding part of the FAT recorded in the information-recording medium.

6. A recording method of a recording apparatus for recording data files on a FAT-formatted information-recording medium, the recording method comprising:
a creating step of dividing a FAT in the information-recording medium into a plurality of segment tables of a predetermined size and creating control information corresponding to each of the segment tables;
a reading step of reading a segment table from the information-recording medium according to the control information created in the creating step;
a maintaining step of maintaining the segment table read in the reading step;
a recording step of referring to the segment table maintained in the maintaining step to detect free unit recording areas in the information-recording medium, and recording the data files in the detected unit recording areas;
an updating step of updating the segment table maintained in the maintaining step, in response to the recording step; and
an overwriting step of partially overwriting the FAT in the information-recording medium with the updated segment table,
wherein the control information includes information for identifying the corresponding segment table, the number of the free unit recording areas indicated by the segment table, the total capacity of the free unit areas, the address of the first free unit recording area indicated by the segment table, and a flag for specifying whether or not the corresponding segment table is to be read at the time of recording the data files.

7. A computer-readable medium storing an executable program that, when executed, causes a computer to control a recording apparatus for recording data files on a FAT-formatted information-recording medium, the program comprising:
a creating step of dividing a FAT in the information-recording medium into a plurality of segment tables of a predetermined size and creating control information corresponding to each of the segment tables;
a reading step of reading a segment table from the information-recording medium according to the control information created in the creating step;
a maintaining step of maintaining the segment table read in the reading step;
a recording step of referring to the segment table maintained in the maintaining step to detect free unit recording areas in the information-recording medium, and recording the data files in the detected unit recording areas;
an updating step of updating the segment table maintained in the maintaining step, in response to the recording step; and
an overwriting step of partially overwriting the FAT in the information-recording medium with the updated segment table, wherein the control information includes information for identifying the corresponding segment table, the number of the free unit recording areas indicated by the segment table, the total capacity of the free unit areas, the address of the first free unit recording area indicated by the segment table, and a flag for specifying whether or not the corresponding segment table is to be read at the time of recording the data files.

* * * * *

UNITED STATES PATENT AND TRADEMARK OFFICE
CERTIFICATE OF CORRECTION

| | | |
|---|---|---|
| PATENT NO. | : 7,613,892 B2 | Page 1 of 1 |
| APPLICATION NO. | : 10/521056 | |
| DATED | : November 3, 2009 | |
| INVENTOR(S) | : Urushibara et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1303 days.

Signed and Sealed this

Nineteenth Day of October, 2010

David J. Kappos
*Director of the United States Patent and Trademark Office*